June 7, 1955  C. HARMANTAS  2,710,324
SENSING ELEMENT FOR THE ELECTRIC HYGROMETER
Filed Feb. 4, 1953
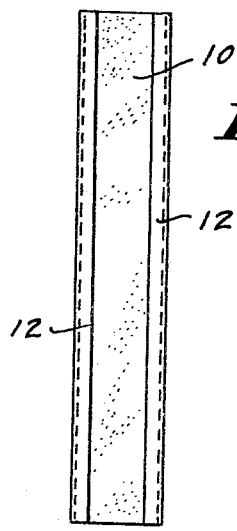
Fig. 1.
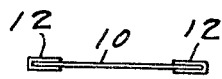
Fig. 2.
Fig. 3.
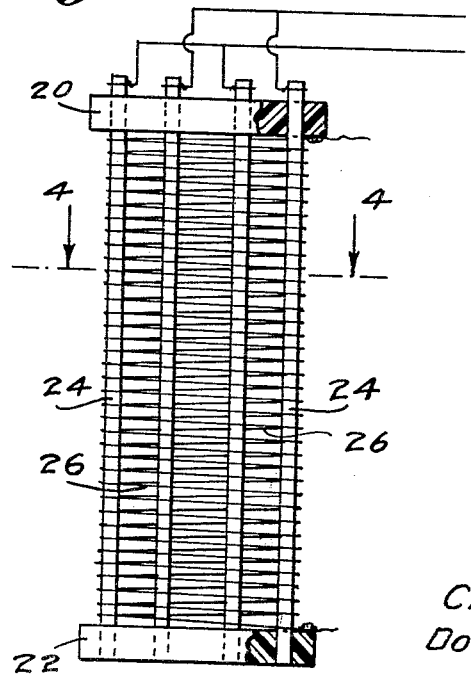
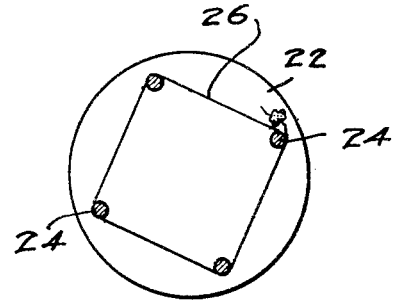
Fig. 4.
CHRISTOS HARMANTAS and
DONALD A. MATHEWS
INVENTORS
BY H. L. Godfrey
ATTORNEY United States Patent Office 2,710,324
Patented June 7, 1955

2,710,324

SENSING ELEMENT FOR THE ELECTRIC HYGROMETER

Christos Harmantas, Bethesda, Md., and Donald A. Mathews, Washington, D. C., assignors to the United States of America as represented by the Secretary of Commerce Application February 4, 1953, Serial No. 335,176

15 Claims. (Cl. 201—63)

(Granted under Title 35, U. S. Code (1952), sec. 266)

The invention described herein may be manufactured and used by or for the Government of the United States for governmental purposes without the payment to us of any royalty thereon in accordance with the provisions of the act of April 30, 1928 (Ch. 460, 45 Stat. L. 467).

This invention relates to humidity responsive devices and, more particularly, to an improved sensing element for electric hygrometers of the type in which the conductivity of a film of a hygroscopic substance situated between two electrodes, varies as a function of the ambient relative humidity. The improved device is particularly, but not exclusively, advantageous when used in direct current measuring circuits, such as, those employed in radiosondes for measuring upper-air humidities.

Heretofore it has not been possible to eliminate polarization from electric hygrometers when used on direct current measuring circuits. The use of binding materials with the electrolyte in order to reduce polarization error and provide the minimum effect from wetting reduced the speed of response of the sensing device. When thinner films of electrolyte were employed to improve speed of response, polarization error increased and the optimum range of calibration decreased. Optimum calibration accuracy, and minimum thermal effect due to the electrolyte and base material could not be achieved with the methods and materials heretofore employed.

The term "polarization" has been loosely applied to electric hygrometer elements to mean apparent increase in resistance and erroneous indication of humidity because of the direct current in the measuring circuit. Actually, polarization is observed in two forms (a) short term polarization where the resistance immediately starts to increase when the circuit is closed and either increases continuously or approaches a steady value after about 15 seconds, then recovers completely almost immediately after the circuit is open; (b) after successive measuring cycles there is a progressive increase of resistance and after about 40 cycles the error in humidity measurement may amount to about 6 per cent or more. The term "polarization" as used hereinafter refers to both of these forms.

An object of this invention is to provide a device with which humidity measurements may be quickly and accurately obtained.

Another object is to provide a device of the type described which may be used in direct current circuits without polarization error.

Another object is to provide a device of the type described in which increase in speed of response is obtained without increase in polarization error.

Another object is to provide a sensing element for electric hygrometers which is quickly, easily and cheaply constructed.

Another object of this invention is to provide improved hygroscopic materials for use in combination with the electrodes of an electric hygrometer.

Another object of this invention is to provide an improved combination of hygroscopic material and electrode materials in an electric hygrometer sensing element.

These and other objects and advantages hereinafter apparent as the ensuing description proceeds are accomplished by this invention which, in general, comprises the use of a non-ionic wetting agent or a combination of a non-ionic wetting agent with other hygroscopic materials to form the humidity responsive film between the electrodes of the sensing element. Another important feature of the invention resides in the use of aluminum electrodes in the hygrometer sensing element in combination with the improved film material.

In the drawings:

Fig. 1 is a side view of a strip hygrometer or sensing element employing the features of this invention.

Fig. 2 is an end view of the device of Fig. 1.

Fig. 3 is an elevational view of another form of hygrometer employing the features of this invention.

Fig. 4 is a sectional view of the device of Fig. 3 taken on the line 4—4 looking in the direction of the arrows.

A non-ionic material suitable for the purpose of this invention consists of a condensation product of an alkyl phenol and ethylene oxide, known chemically as alkyl aryl polyether alcohol. An example of such material is the product Triton X–100 (Rohm and Haas). It has been discovered that this wetting agent is a material having remarkable properties in humidity elements. Alkyl aryl polyether alcohols, such as Triton X–100, are non-ionic, but conduct electric current when in solution. No polarization is observed even with extremely thin films of this material, and in combination with aluminum electrodes. Moreover, polarization is eliminated when an alkyl aryl polyether alcohol is mixed in proper proportions with certain new combinations of hygroscopic salts previously used in hygrometers when the mixture is employed in combination with tin, zinc, and aluminum electrodes.

The above-mentioned material not only exhibits adequate moisture sensitive properties to be satisfactorily used alone as the sensitive hygroscopic film between the electrodes of the hygrometer element, but in addition possesses sufficient "anti-washing out" properties to enable it to be used without a binder on plastic base material. Dipping solutions in which this material is employed in combination with hygroscopic salts as hereinafter described may also be used without extraneous binding materials, as the alkyl aryl polyether alcohol acts as a combined binder and wetting agent. However, it is to be understood that combinations of alkyl aryl polyether alcohol with any of the previously used binders and other extraneous materials are within the scope of the present invention.

Elimination of inert materials such as polyvinyl alcohol or polyvinyl acetate, previously used for the purpose of binding the completed film in place, gives a gain in speed of response of the film to ambient moisture theoretically proportional to the amount that would be lost if it were necessary to use binding material. Thus, with the use of Triton X–100 in place of inert binders the speed of response may be reduced from several seconds to a fraction of a second.

Elements using aluminum electrodes and a film comprising Triton X–100 exhibit no observable hysteresis, the aging characteristics are satisfactory, and over-all calibration accuracy is improved through elimination of polarization.

Referring now to Figs. 1 and 2 of the drawing, illustrative of a strip hygrometer element, 10 represents a strip of plastic base material which may, for example, be of polystyrene or of Saran. Other plastic base materials may be used, but the materials mentioned are preferred because they exhibit minimum moisture absorption. Metal electrodes 12 preferably of aluminum are attached to opposite edges of the plastic strip in any convenient manner. For example, aluminum foil may be attached to opposite edges of the plastic by puncturing the foil with a hot tool, such as the tip of a soldering iron, or in a mold, so that the molten plastic flows into the punctures in the foil. Alternatively the aluminum foil may be cemented to the plastic by a suitable metal-to-plastic cement. Caution should be exercised to assure that no space is left between the edge of the foil and plastic where an excess of electrolyte may collect and become trapped.

Dimensions of electrodes and plastic surfaces, and distances between electrodes, may be determined experimentally to suit the particular requirements for range of resistance. A suitable strip may, for example, be about 10 cm. long with about 1 cm. spacing between electrodes on both sides. This size element allows 20 sq. cm. of surface area on which the humidity sensitive film may be formed.

The electrodes must be spaced a uniform distance apart to make elements of uniform characteristics. Moving electrodes closer together makes the humidity versus resistance characteristic steeper, and moving them apart gives the characteristic a flatter slope.

After the strip element has been prepared, a humidity responsive film is formed by dipping or washing it in a solution of hygroscopic materials. The element is covered with solution, and then withdrawn, drained of excess liquid and dried. The film forms uniformly on the surface of the strip through surface tension. Elements coated in this manner with the solutions described herein do not polarize, and, accordingly, may be used in either A. C. or D. C. measuring circuits.

The basic ingredients of the solutions used in forming the humidity sensitive film are:

1. Water
2. Hygroscopic salt or salts
3. Alkyl aryl polyether alcohol, such as Triton X-100

As previously mentioned, for certain uses aqueous solutions of Triton X-100 without addition of hygroscopic salts may be used as the moisture sensitive material. Concentrations of from 25 per cent to 99 per cent may be satisfactorily used in coating hygrometer elements. An element so prepared indicates changes throughout the entire humidity spectrum of 100 to 6 per cent, the lowest value measured.

For hygrometer uses in which high measuring circuit resistance is practicable, or where rapid speed of response is not necessary the coating of Triton X-100 alone may be used upon a strip hygrometer element of the type described and shown in Figs. 1 and 2. However, the resistance of thin films of this material alone on strip elements of this type is too high to match present radio sonde circuits, and when the resistance is decreased to the desired range by increasing the film thickness the rate of response may become undesirably low. This may be remedied by changing the dimensions or by using other means for decreasing resistance as will be described below in connection with Fig. 3, or by using mixtures containing hygroscopic salts.

In general, concentrations of from 1 per cent or less up to 10 per cent of hygroscopic salt with Triton X-100 may be employed depending on desired usage.

Concentration of about 5 to 10 per cent LiCl and about an equal concentration of Triton X-100 will give optimum resistance humidity characteristics with aluminum electrodes in a strip hygrometer as illustrated in Figs. 1 and 2 and used in average measuring circuits, such as in the presently available radio-sondes. The concentration of Triton X-100 in this solution with the strip using aluminum electrodes may be varied considerably without adverse effect on performance characteristics. This concentration has been varied from 1 per cent to 16 per cent without measurable change in the time lag. However, without this material other wetting agents must be used with resulting polarization.

The resistance of the element will decrease as the concentration of the salt is increased, and the speed of response will be primarily a function of the quantity of LiCl present, 5 per cent giving about 5 seconds time lag and 10 per cent giving about 10 seconds time lag, for 90 per cent change in humidity. Should polarization be observed with a given solution, it may be eliminated by increasing the concentration of Triton X-100.

While in some instances zero polarization may be obtained with the solutions of this invention when an element using tin electrodes is employed, use of aluminum electrodes is preferable because of the greater ease in achieving zero polarization over wide ranges of concentration.

With aluminum electrodes, and with films employing a combination of Triton X-100 and salts other than $AlCl_3$, a transient effect is observed at the lower measuring circuit voltages whereby the indication of resistance is unreliable for the first second or two of reading through the hygrometer. This phenomenon does not affect the accuracy of subsequent readings and may be disregarded, or may be eliminated through the addition of 1 per cent or more of $AlCl_3$ to the dipping solution.

Solutions made up of lithium chloride, aluminum chloride, and Triton X-100 in proper proportions exhibit increased speeds of response over the same quantity of either salt used alone. A favorable combination of these materials is the ratio of 4 parts by volume of a solution of lithium chloride saturated at 25° C. to 1 part by volume of a solution of aluminum chloride saturated at 25° C., with the proportion of Triton X-100 in that amount necessary to eliminate polarization. A suitable solution of this type is made up by combining about 8 per cent by volume of a saturated solution of lithium chloride, 2 per cent by volume of a saturated solution of aluminum chloride, 1 per cent of Triton X-100, and diluting with water to 100 per cent.

Elements suitable for radio sonde measuring circuits have been prepared with the above solution on strips having 20 sq. cm. surface area with aluminum electrodes spaced 1 cm. apart, and exhibited time lags of 1 to 3 seconds for 90 per cent change in humidity. By increasing the resistance of this solution through dilution with additional water, elements may be made with time lags less than ½ second.

Similarly, fast elements may be made with 5 per cent to 10 per cent aqueous solutions of a combination of LiCl and $AlCl_3$ mixed in proportions corresponding to the molecular weights of $LiCl.AlCl_3$ (lithium tetrachloro aluminate) with sufficient Triton X-100 to eliminate polarization.

Plastic material in sheet form, such as used in the strip hygrometer elements shown in Figs. 1 and 2, need to be about 0.040 in. thick to possess sufficient mechanical rigidity. Elements made with plastic of this thickness, while satisfactory for general use, have undesirably large coefficients of temperature, due to the mass of plastic, in applications where rapid changes are anticipated. Devices utilizing less thick plastic but of such form as to possess adequate mechanical strength are desirable for such purposes. To this end, Saran monofilaments may be used in place of sheet plastic. Saran has great tensile strength, and is suitable for winding on coil forms, with the coil form ribs constituting the electrodes. The electrolyte may be coated on the Saran filament either before or after the winding by any suitable method. Saran thread is available in diameters as small as 0.005 in.

A device illustrative of this form of hygrometer is shown in Fig. 3. Plastic base members 20 and 22, respectively, support a plurality of aluminum ribs or electrodes 24. A large number of windings 26 of Saran filament are coiled around the aluminum electrodes and are fixed at the ends to the base members 20 and 22 by any suitable means, as, for example, by cementing as shown. These windings are suitably coated with the film of hygroscopic material. The aluminum electrodes are alternately connected in pairs in a measuring circuit and the change in resistance between the pairs of electrodes due to change in resistivity of the hygroscopic coating on the Saran filaments is an indication of change in the ambient humidity.

Since the electrode length and film area in this type of construction may be greatly increased over that of devices using sheet plastic, thinner films of coating material may be employed with a corresponding gain in speed of response of the element without excessively increasing the resistance. High speed, thin films are made practical by use of devices of this type and by use of solutions disclosed herein in which polarization error in thin films is eliminated. The number of electrodes and number of windings may be increased as necessary to achieve the resistance range desired.

The following table based on test data summarizes the advantages realized by the improved sensing element of this invention. In the comparisons shown, the old elements comprised tin electrodes with lithium chloride film material. The new elements employed aluminum electrodes and the film materials of this invention containing Triton X-100 as described above.

Table I

|   | Old Element | New Element |
| --- | --- | --- |
| 1. Speed of response | 10 sec | 1 sec. or less. |
| 2. Polarization | 4% | 0. |
| 3. "Washing out" | some | approximately identical to old element. |
| 4. Calibration accuracy | good | good. |
| 5. Range | limited | flexible. |
| 6. Thermal effect | do | Do. |

From the foregoing description it is apparent that improved hygrometer elements have been provided which not only possess superior properties for general use as heretofore employed, but also by virtue of flexibility of operation may be adapted to many special uses for which electric hygrometers are desirable.

The addition of non-ionic wetting agent, such as Triton X-100, to the formula used for the earlier hygrometers has shown a marked improvement on polarization. Where speed of response is not of paramount importance, as for example for humidity observations on the ground instead of in the radiosonde, further improvement on anti-washing out properties can be made by combining one or more of the above wetting agents with an oil, either a mineral or a silicon oil, with or without a hygroscopic salt. The resulting resinous mixture resists washing out longer than is possible with previous radiosonde elements.

While the foregoing description refers particularly to Triton X-100 as the preferred non-ionic wetting agent for the purposes of this invention, it will be understood that other alkyl aryl polyether alcohols and non-ionic wetting agents having similar properties may also be used.

It will be appreciated from a reading of the foregoing specification that the invention herein described is susceptible of various changes and modifications without departing from the spirit and scope thereof.

What is claimed is:

1. A hygrometric resistance element including at least two conductors joined by insulating material, and a film of hygroscopic material coated thereon, said film comprising an alkyl aryl polyether alcohol wetting agent.

2. A hygrometric resistance element including at least two conductors joined by insulating material, and a film of hygroscopic material coated thereon, said film comprising a hygroscopic salt and an alkyl aryl polyether alcohol wetting agent.

3. A hygrometric resistance element including at least two conductors joined by insulating material, and a film of hygroscopic material coated thereon, said film comprising lithium chloride and an alkyl aryl polyether alcohol wetting agent.

4. A hygrometric resistance element including at least two conductors joined by insulating material, and a film of hygroscopic material coated thereon, said film comprising lithium chloride, aluminum chloride, and an alkyl aryl polyether alcohol wetting agent.

5. A hygrometric resistance element including at least two conductors of aluminum metal joined by plastic material, and a film of hygroscopic material coated thereon, said film comprising an alkyl aryl polyether alcohol wetting agent.

6. A hygrometric resistance element including at least two conductors of aluminum metal joined by plastic material, and a film of hygroscopic material coated thereon, said film comprising a hygroscopic salt and an alkyl aryl polyether alcohol wetting agent.

7. A hygrometric resistance element including at least two conductors of aluminum metal joined by plastic material, and a film of hygroscopic material coated thereon, said film comprising lithium chloride and an alkyl aryl polyether alcohol wetting agent.

8. A hygrometric resistance element including at least two conductors of aluminum metal joined by plastic material, and a film of hygroscopic material coated thereon, said film comprising lithium chloride, aluminum chloride, and an alkyl aryl polyether alcohol wetting agent.

9. A hygrometric resistance element including at least two conductors of aluminum metal joined by plastic material, and a film of hygroscopic material coated thereon, said film being deposited from a solution comprising a saturated solution of lithium chloride, and a saturated solution of aluminum chloride in the ratio of about 4 to 1 by volume and an alkyl aryl polyether alcohol wetting agent.

10. A hygrometric resistance element including at least two conductors of aluminum metal joined by plastic material, and a film of hygroscopic material coated thereon, said film comprising lithium chloride and aluminum chloride in substantially the proportions corresponding to their molecular weights in $LiCl \cdot AlCl_3$ and an alkyl aryl polyether alcohol wetting agent.

11. A hygrometer resistance element including at least two conductors of aluminum metal joined by plastic material and a thin film of hygroscopic material deposited from an aqueous solution comprising 25 to 99 per cent of an alkyl aryl polyether alcohol wetting agent.

12. A hygrometer resistance element including at least two conductors of aluminum metal joined by plastic material and a thin film of hygroscopic material deposited from an aqueous solution containing about 8 per cent of a saturated solution of $LiCl_3$, 2 per cent of a saturated solution of $AlCl_3$, and 1 per cent of an alkyl aryl polyether alcohol wetting agent.

13. A hygrometer resistance element including at least two conductors of aluminum metal joined by plastic material and a thin film of hygroscopic material deposited from a solution containing from about 1 per cent to about 10 per cent LiCl and from about 1 per cent to about 16 per cent of an alkyl aryl polyether alcohol wetting agent.

14. A hygrometer resistance element including at least two conductors of aluminum metal joined by plastic material and a thin film of hygroscopic material deposited from a solution containing from about 1 per cent to about 10 per cent LiCl and from about 1 per cent to about 16 per cent of an alkyl aryl polyether alcohol wetting agent and a small quantity of $AlCl_3$.

15. A hygrometric resistance element comprising at least two spaced aluminum electrodes, a plurality of windings of plastic filament around said electrodes, and a film of hygroscopic material comprising an alkyl aryl polyether alcohol wetting agent on said plastic filament.

References Cited in the file of this patent

UNITED STATES PATENTS

| | | |
|---|---|---|
| 2,213,477 | Steindorff et al. | Sept. 3, 1940 |
| 2,237,006 | Koller | Apr. 1, 1941 |
| 2,372,829 | Holst | Apr. 3, 1945 |
| 2,481,728 | Dember | Sept. 13, 1949 |
| 2,554,440 | Coburn | May 22, 1951 |